United States Patent
Komatsu

[19]

[11] Patent Number: 5,881,057
[45] Date of Patent: Mar. 9, 1999

[54] SYNCHRONOUS DETECTOR WITH REDUCED ERROR COMPUTATION FOR MAXIMAL-RATIO COMBINING

[75] Inventor: Masahiro Komatsu, Tokyo, Japan

[73] Assignee: NEC Corporation, Japan

[21] Appl. No.: 715,390

[22] Filed: Sep. 13, 1996

[30] Foreign Application Priority Data

Sep. 13, 1995 [JP] Japan .................................. 7-235128

[51] Int. Cl.$^6$ .................................................. H04J 13/04
[52] U.S. Cl. .......................... 370/335; 370/342; 375/209; 375/210
[58] Field of Search .................................. 375/200, 204, 375/208, 209, 210, 206, 343, 346; 370/320, 342, 479, 206, 209, 210, 335

[56] References Cited

U.S. PATENT DOCUMENTS

| | | | |
|---|---|---|---|
| 5,237,586 | 8/1993 | Bottomley | 370/206 |
| 5,361,276 | 11/1994 | Subramanian | 375/200 |
| 5,548,613 | 8/1996 | Kaku et al. | 375/208 |
| 5,691,974 | 11/1997 | Zehavi et al. | 370/203 |
| 5,694,388 | 12/1997 | Sawhashi et al. | 370/206 |
| 5,719,899 | 2/1998 | Thielecke et al. | 370/320 |

FOREIGN PATENT DOCUMENTS

| | | |
|---|---|---|
| 5103030 | 4/1993 | Japan . |
| 5207088 | 8/1993 | Japan . |
| 750627 | 2/1995 | Japan . |

Primary Examiner—Chau Nguyen
Assistant Examiner—Soon-Dong Hyun
Attorney, Agent, or Firm—Ostrolenk, Faber, Gerb & Soffen, LLP

[57] ABSTRACT

In a RAKE receiver, a radio frequency CDMA signal is converted to a baseband digital signal and despread with multiple despreading sequences of different phase timing to produce multiple despread signals. Synchronous detectors are arranged to receive the despread signals as input symbol sequences and cross-correlations between the input symbol sequences and an output symbol sequence, detect an auto-correlation of the output symbol sequence, produce fading vectors representative of ratios of the cross-correlations to the auto-correlation, demodulate the input symbol sequences with the fading vectors, detect auto-correlations of the input symbol sequences, and estimate errors from the fading vectors, the cross-correlations and the auto-correlations of the input symbol sequences. Amplitudes of the input symbol sequences are estimated from the auto-correlations of the input symbol sequences. The demodulated sequences are maximal-ratio combined according to the estimated errors and the estimated amplitudes. From the combined signal, the output symbol sequence is produced by a decision circuit.

11 Claims, 2 Drawing Sheets

5,881,057

SYNCHRONOUS DETECTOR WITH REDUCED ERROR COMPUTATION FOR MAXIMAL-RATIO COMBINING

BACKGROUND OF THE INVENTION

1. Field of the Invention

The present invention relates generally to synchronous detectors, and more specifically to synchronous detection for use in a CDMA (code division multiple access) RAKE receiver.

2. Description of the Related Art

According to a prior art synchronous detection scheme used in a CDMA (code division multiple access) RAKE receiver, an input sequence i(n) is cross-correlated with a decision output sequence o(n), and auto-correlation φ(n) of the output sequence o(n) is detected. The cross-correlation θ(n) is divided by the auto-correlation φ(n) and the divided signal Z(n) is supplied to a demodulator where a demodulation of the input sequence proceeds by multiplication with Z(n). The output of the demodulator is combined with the outputs of other synchronous detectors in a combiner. From the output of the combiner, the decision output sequence is produced by a decision circuit. The amplitude of the signal received by each synchronous detector of the RAKE receiver is estimated by performing a square-and-sum process on the input sequence i(n). In addition, the decision error is estimated by calculating e(n)=i(n)−Z(n).o(n) at symbol intervals and a square-and-sum process is performed on the estimated error e(n). According to these estimated amplitude and error, the outputs of the synchronous detectors are weighted so that they are maximal-ratio combined in the combiner.

However, the prior art error estimation requires, at symbol intervals, two multiplication processes at the level of signal e(n), and one subtraction process and two multiplication processes at the level of complex values. Since the CDMA RAKE receiver requires such computation for each of propagation paths, the amount of total computations is substantial.

SUMMARY OF THE INVENTION

It is therefore an object of the present invention to reduce the amount of computations for a RAKE receiver.

According to a first aspect, the present invention provides a synchronous detector, in which a cross-correlation between an input symbol sequence and an output symbol sequence is detected, and an auto-correlation of the output symbol sequence is detected, and a fading vector is produced, representing a ratio of the cross-correlation to the auto-correlation. The fading vector is used to demodulate the input symbol sequence. An auto-correlation of the input symbol sequence is further detected, and an error is estimated from the fading vector, the cross-correlation and the auto-correlation of the input symbol sequence.

According to a second aspect, the present invention provides a CDMA RAKE receiver comprising an antenna, a downconverter for converting the output of the antenna to a lower frequency signal, a plurality of despreaders for despreading the output of the downconverter with a plurality of despreading sequences of different phase timing, and a plurality of synchronous detectors. The synchronous detectors respectively receive the despread signals as input symbol sequences, detect cross-correlations between the input symbol sequences and an output symbol sequence, detect an auto-correlation of the output symbol sequence, produce fading vectors representative of ratios of the cross-correlations to the auto-correlation, demodulate the input symbol sequences with the fading vectors, detect auto-correlations of the input symbol sequences, and estimate errors from the fading vectors, the cross-correlations and the auto-correlations of the input symbol sequences. The demodulated sequences are maximal-ratio combined according to the estimated errors and a decision circuit produces the output symbol sequence from the combined signal.

BRIEF DESCRIPTION OF THE DRAWINGS

The present invention will be described in further detail with reference to the accompanying drawings, in which.

DETAILED DESCRIPTION

Figure 1:
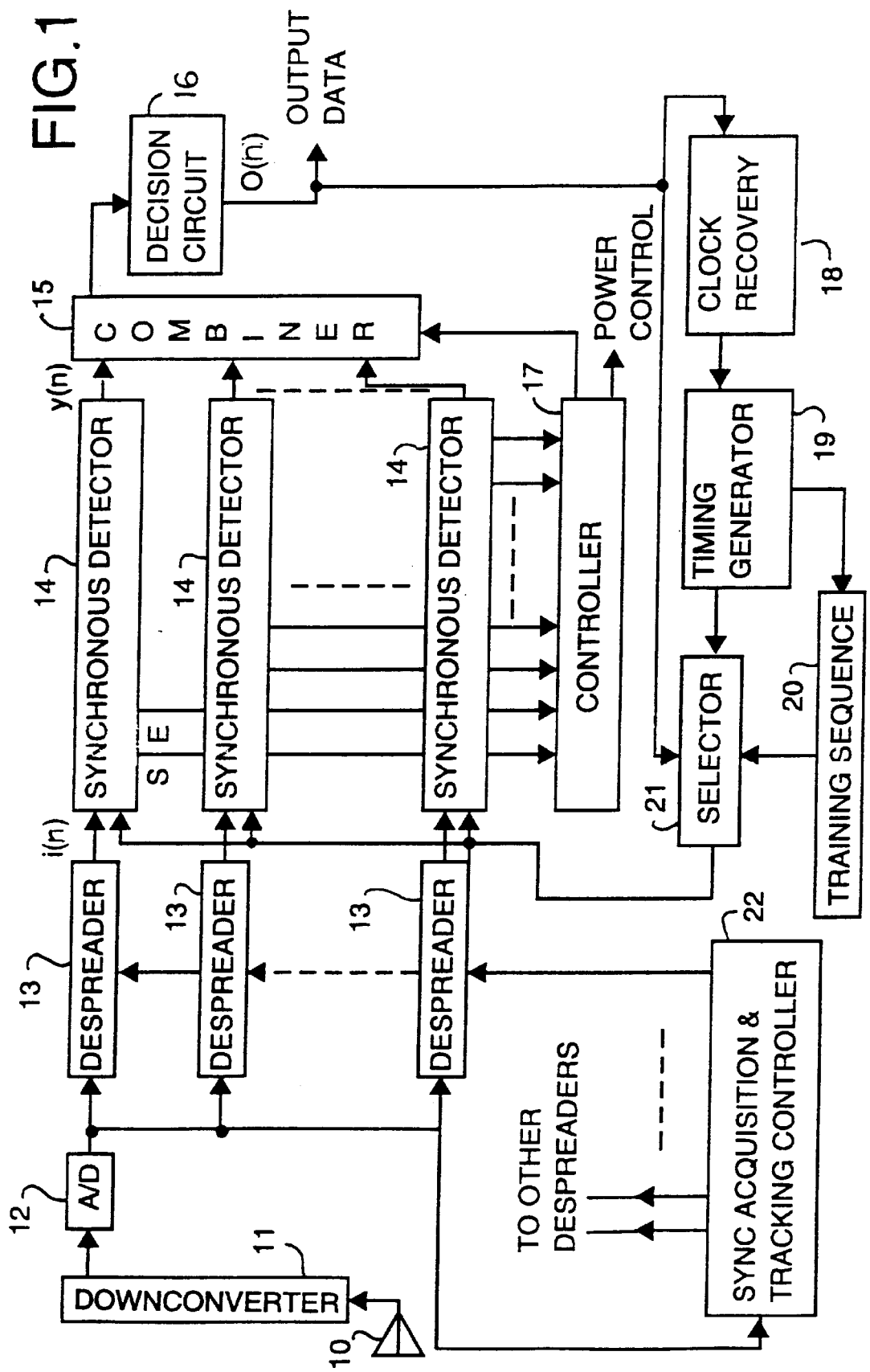
FIG. 1 is a block diagram of a CDMA RAKE receiver according to the present invention.

As illustrated in FIG. 1, a CDMA (code division multiple access) receiver according to this invention comprises an antenna 10, a downconverter 11, an analog-to-digital converter 12 and a plurality of despreaders 13. In the downconverter, the output of antenna 10 is low-noise amplified, bandpass-filtered and downconverted to a baseband signal. The baseband signal is then converted to a digital signal by A/D converter 12. A pseudorandom number despreading sequence of different phase timing is supplied to each despreader 13 from a sync acquisition and tracking circuit 22 for recovering the original symbol sequence in a manner as described in U.S. Pat. No. 5,548,613 issued to T. Kaku et al and assigned to the same assignee as the present invention. The despreaders 13 thus produce a plurality of despread symbol sequences which can be considered as representation of different propagation paths caused by multiple reflections of a transmitted signal.

The data input sequence i(n) from each despreader is supplied to the data input terminal of a corresponding one of a plurality of synchronous detectors 14. Each synchronous detector also receives an output signal from a selector 21. As will be described, each synchronous detector provides the detection of a cross-correlation between the input symbol sequence from the corresponding despreader and the output sequence from the selector 21 which is either a decision sequence from a decision circuit 16 or a training sequence from a training sequence generator 20. The training sequence is identical to the sequence that is periodically received on specified time slots from the transmit site for purposes of synchronization. Auto-correlation of the data input sequence i(n) and auto-correlation of the decision or training sequence are taken in each synchronous detector 14. A fading vector is then derived from the cross-correlation and the auto-correlation of the data output sequence. The data input sequence i(n) is multiplied with the fading vector to produce a demodulated signal y(n), where n is the symbol indicator. The demodulated signals y(n) of all synchronous detectors are supplied to a combiner 15 where they are respectively weighted according to weight control signals and maximal-ratio combined and supplied to the decision circuit 16. The weight control signals are supplied from a controller 17.

The decision circuit 16 produces a data output sequence o(n) which is coupled to an external utilization circuit, not shown. The output sequence o(n) is also fed to a clock recovery circuit 18 to recover the transmitted clock timing signal, which is applied to a timing generator 19. Timing generator 19 produces timing signals for clocking the training sequence generator 20 during the specified time slots. When the training sequence is produced, the timing generator 19 commands the selector 21 to apply this sequence to the synchronous detectors. At other times, the timing generator 19 commands the selector to couple the output data sequence o(n) to the synchronous detectors.

Figure 2:
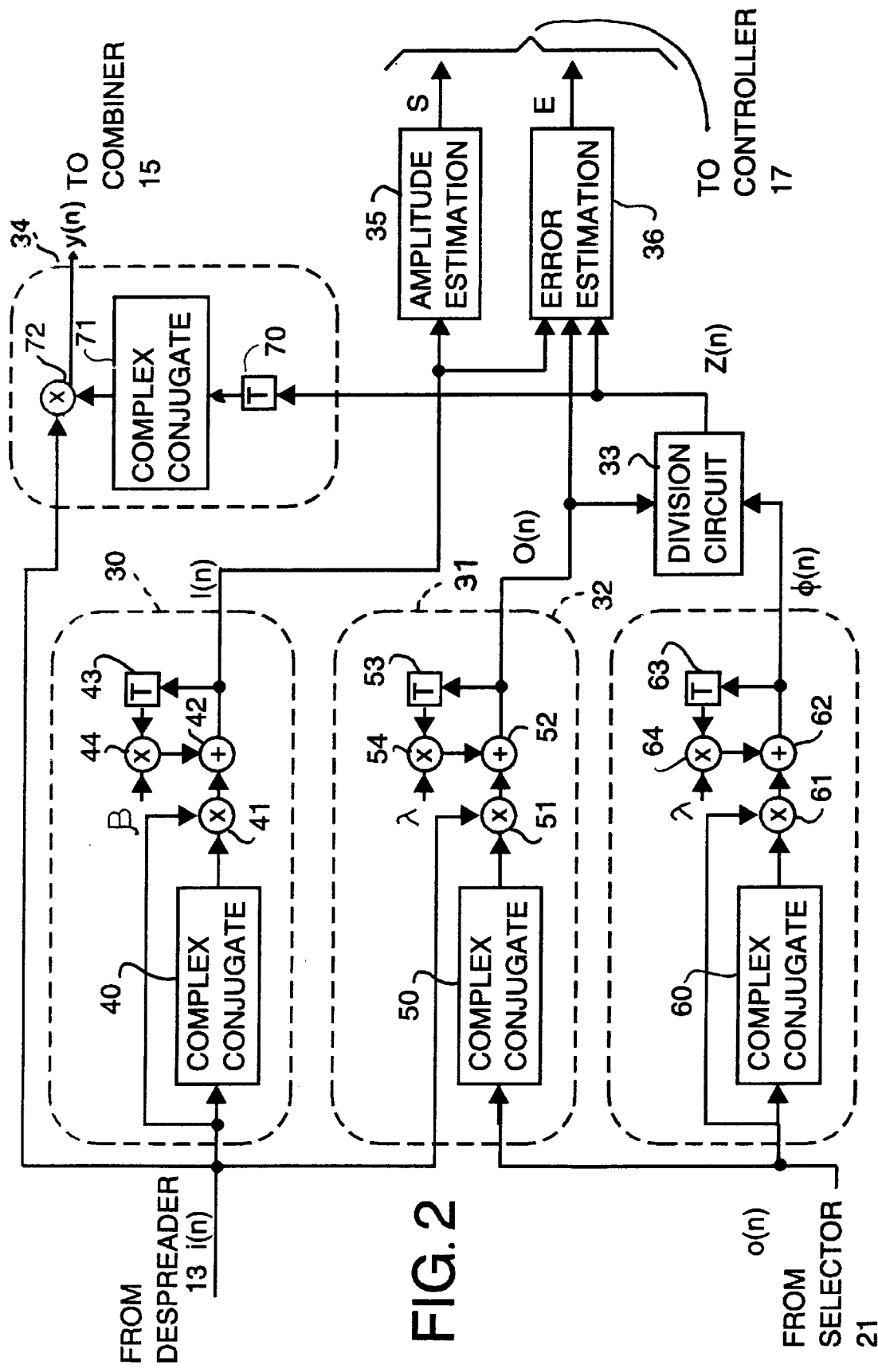
FIG. 2 is a block diagram of a synchronous detector according to the present invention.

As shown in FIG. 2, each synchronous detector includes an auto-correlators 30 and 32 and a cross-correlator 31, a division circuit 33, a demodulator 34, an amplitude estimation circuit 35 and an error estimation circuit 36.

The input signal i(n) is a complex signal. Auto-correlator 30 has a complex conjugate converter 40 where the input signal is converted to a complex conjugate and fed to a multiplier 41 where it is multiplied with the complex input sequence i(n). The output of multiplier 41 is coupled to an adder 42 whose output is delayed by a symbol interval T in a delay circuit 43. The delayed signal is weighted by a weighting factor $\beta$ in a multiplier 44 and fed to the adder 42 where it is summed with the output of multiplier 41 to produce an auto-correlation signal I(n), which is given by the following Equation:

$$I(n) = \sum_{k=1}^{n} \beta^{n-1}|i(k)|^2 \quad (1)$$

Cross-correlator 31 includes a complex conjugate converter 50 where the output symbol sequence is converted to a complex conjugate and fed to a multiplier 51 where it is multiplied with the complex input sequence i(n). The output of multiplier 41 is coupled to an adder 52 whose output is delayed by a symbol interval T in a delay circuit 53. The delayed signal is weighted by a weighting factor $\lambda$ in a multiplier 54 and fed to the adder 52 where it is summed with the output of multiplier 51 to produce a cross-correlation output signal $\theta(n)$. Therefore, the cross-correlation $\theta(n)$ is represented as:

$$\theta(n) = \sum_{k=1}^{n} \lambda^{n-1} i(k) \cdot o^*(k) \quad (2)$$

where $o^*(k)$ is the complex conjugate of the sequence o(k).

In a similar manner, auto-correlator 32 has a complex conjugate converter 60 where the output symbol sequence o(n) is converted to a complex conjugate and fed to a multiplier 61 where it is multiplied with the output sequence o(n). The output of multiplier 61 is coupled to an adder 62 whose output is delayed by a symbol interval T in a delay circuit 63. The delayed signal is weighted by weighting factor $\lambda$ in a multiplier 64 and fed to the adder 62 where it is summed with the output of multiplier 61 to produce an auto-correlation output signal $\phi(n)$. Therefore, the auto-correlation $\phi(n)$ is given as follows:

$$\phi(n) = \sum_{k=1}^{n} \lambda^{n-1}|o(k)|^2 \quad (3)$$

The outputs of cross-correlator 31 and auto-correlator 32 are fed to a division circuit 33 where $\theta(n)$ is divided by $\phi(n)$ as follows to produce the fading vector $Z(n)=\theta(n)/\phi(n)$.

The output of division circuit 33 is coupled to the demodulator 34. In the demodulator 34, the fading vector Z(n) is delayed by a symbol interval by a delay circuit 70, and supplied to a complex conjugate converter 71. The complex conjugate of the fading vector Z(n) is fed to a multiplier 72 where it is multiplied with the complex input symbol sequence i(n) to produce a demodulated output signal y(n).

The output signal I(n) of auto-correlator 30 is applied to an amplitude estimator 35 where the following calculation is performed to represent the amplitude of the signal received by the antenna.

$$S = \frac{n}{\sum_{k=1}^{n} \beta^{n-1}} \cdot I(n) \quad (4)$$

An error estimator 36 is provided for estimating the decision error E. Since the decision error does not vary as rapidly as symbols occur, it is not necessary to estimate the decision error at symbol intervals. Error estimation can be performed at frame intervals, for example. The present invention is intended to reduce the amount of computations performed by the error estimator 36 of each synchronous detector by taking inputs from auto-correlator 30, cross-correlator 31 and division circuit 33 and solving the following Equation:

$$E = \frac{n}{\sum_{k=1}^{n} \beta^{n-1}} \cdot I(n) - \frac{1}{\sum_{k=1}^{n} \lambda^{n-1}} \cdot Z(n) \cdot \theta(n) \quad (5)$$

The controller 17 uses the amplitude estimate S and the error estimate E of each synchronous detector 14 for weighting the output signals y(n) of the respective synchronous detectors so that they are combined at a maximal ratio in the combiner 15. In addition, the controller produces a signal which will be used for power control purposes.

Note that the weighting factors $\beta$ and $\lambda$ used in the correlation processes described above are chosen at such values that cause the decision error to converge to a minimum according to the RLS (recursive least-squares) algorithm.

Since the amount of computations is reduced in each of the synchronous detectors 14, a substantial reduction is achieved in the total computational burden of the CDMA RAKE receiver.

Computer simulations showed that the time taken to obtain an error estimate E for a 100-symbol frame was 702 computational time units, which compares favorably with prior-art 900 computational time units.

What is claimed is:

1. A synchronous detector comprising:

means for detecting a cross-correlation between an input symbol sequence and an output symbol sequence;

means for detecting an auto-correlation of said output symbol sequence;

means for producing a fading vector representative of a ratio of said cross-correlation to said auto-correlation;

means for demodulating the input symbol sequence with said fading vector;

means for detecting an auto-correlation of said input symbol sequence; and means for estimating an error from the fading vector, the cross-correlation and the auto-correlation of the input symbol sequence.

2. A synchronous detector as claimed in claim 1, further comprising means for estimating an amplitude of the input symbol sequence from the auto-correlation of the input symbol sequence.

3. A code division multiple access (CDMA) RAKE receiver comprising:

an antenna;

means for converting a signal from the antenna to a lower frequency signal;

a plurality of despreaders for despreading the lower frequency signal with a plurality of despreading sequences of different phase timing to produce a plurality of despread signals;

a plurality of synchronous detectors for receiving the despread signals as input symbol sequences, detecting cross-correlations between the input symbol sequences and an output symbol sequence, detecting an auto-correlation of said output symbol sequence, producing fading vectors representative of ratios of said cross-correlations to said auto-correlation, demodulating the input symbol sequences with said fading vectors, detecting auto-correlations of said input symbol sequences, and estimating errors from the fading vectors, the cross-correlations and the auto-correlations of the input symbol sequences;

a combiner for combining the sequences demodulated by said synchronous detectors to produce a combined signal;

a decision circuit for producing said output symbol sequence from said combined signal; and a controller for weighting the demodulated input symbol sequences according to the errors estimated by said synchronous detectors so that the demodulated input symbol sequences are maximal-ratio combined by said combiner.

4. A CDMA RAKE receiver as claimed in claim 3, wherein said synchronous detectors include means for estimating amplitudes of said input symbol sequences from the auto-correlations of the input symbol sequences, said controller being responsive to the estimated amplitudes for weighting the demodulated input symbol sequences.

5. A method for receiving a signal comprising the steps of:

detecting a cross-correlation between an input symbol sequence and an output symbol sequence;

detecting an auto-correlation of said output symbol sequence;

producing a fading vector representative of a ratio of said cross-correlation to said auto-correlation;

demodulating the input symbol sequence with said fading vector;

detecting an auto-correlation of said input symbol sequence; and estimating an error from the fading vector, the cross-correlation and the auto-correlation of the input symbol sequence.

6. A method as claimed in claim 5, further comprising the step of estimating an amplitude of the input symbol sequence from the auto-correlation of the input symbol sequence.

7. A method for receiving a CDMA (code division multiplex access) signal, comprising the steps:

a) converting the received signal to a lower frequency signal;

b) despreading the lower frequency signal with a plurality of despreading sequences of different phase timing to produce a plurality of despread symbol sequences;

b) detecting cross-correlations between the despread symbol sequences and an output symbol sequence;

c) detecting an auto-correlation of said output symbol sequence and detecting auto-correlations of said despread symbol sequences;

d) producing fading vectors representative of ratios of said cross-correlations to the auto-correlation of the output symbol sequence;

e) demodulating the despread symbol sequences with said fading vectors;

f) estimating errors from the fading vectors, the cross-correlations and the auto-correlations of the despread symbol sequences; and g) combining the demodulated sequences according to the estimated errors to produce a combined signal and deriving therefrom said output symbol sequence.

8. A method as claimed in claim 7, further comprising the step of estimating amplitudes of said input symbol sequences from the auto-correlations of the despread symbol sequences, wherein the step (g) comprises weighting the demodulated symbol sequences according to the estimated amplitudes.

9. A synchronous detector comprising:

an input circuit generating an input symbol sequence;

an output circuit generating an output symbol sequence;

a cross-correlator coupled to the input circuit and coupled to the output circuit, the cross-correlator detecting a cross-correlation between the input symbol sequence generated by the input circuit and the output symbol sequence generated by the output circuit;

a first auto-correlator coupled to the output circuit and detecting a first auto-correlation of the output symbol sequence generated by the output circuit;

a second auto-correlator coupled to the input circuit and detecting a second auto-correlation of the input symbol sequence generated by the input circuit;

a fading vector generator coupled to the cross-correlator and coupled to the first auto-correlator, the fading vector generator generating a fading vector representative of a ratio of the cross-correlation detected by the cross-correlator to the first auto-correlation detected by the first auto-correlator;

a demodulator coupled to the input circuit and coupled to the fading vector generator, the demodulator demodulating the input symbol sequence generated by the input circuit in response to the fading vector generated by the fading vector generator; and an error estimator coupled to the fading vector generator, coupled to the cross-correlator and coupled to the second auto-correlator, the error estimator generating an error estimate in response to the fading vector generated by the fading vector generator, in response to the cross-correlation detected by the cross-correlator and in response to the second auto-correlation detected by the second auto-correlator.

10. A synchronous detector as recited in claim 9, further comprising an amplitude estimator coupled to the second auto-correlator and generating an estimated amplitude of the input symbol sequence in response to the auto-correlation detected by the second auto-correlator.

11. A code division multiple access (CDMA) RAKE receiver comprising:

an antenna generating an input signal;

a converter coupled to the antenna and converting the input signal from the antenna to a lower frequency signal;

a plurality of despreaders coupled to the converter, the plurality of despreaders generating a plurality of despread signals by despreading the lower frequency signal with a plurality of despreading sequences of different phase timing;

a plurality of synchronous detectors coupled to the plurality of despreaders, the plurality of synchronous detectors receiving the despread signals as input symbol sequences and detecting cross-correlation between the input symbol sequence and an output symbol sequence, detecting an auto-correlation of the output symbol sequence, generating fading vectors representative of ratios of the cross-correlations to the auto-correlation, demodulating the input symbol sequences with the fading vectors, detecting auto-correlations of the input symbol sequences, and estimating errors from the fading vectors, the cross-correlations and the auto-correlations of the input symbol sequences;

a combiner coupled to the plurality of synchronous detectors and generating a combined signal by combining the demodulated input symbol sequences generated by the plurality of synchronous detectors;

a decision circuit coupled to the combiner and generating the output symbol sequence in response to the combined signal generated by the combiner; and a controller coupled to the plurality of synchronous detectors and weighting the demodulated input symbol sequences according to the errors estimated by the plurality of synchronous detectors such that the demodulated input symbol sequences are maximal-ratio combined by said combiner.

* * * * *